US008126319B2

(12) United States Patent
De Luca

(10) Patent No.: US 8,126,319 B2
(45) Date of Patent: Feb. 28, 2012

(54) RADIANT OVEN WITH STORED ENERGY DEVICES AND RADIANT LAMPS

(75) Inventor: Nicholas P. De Luca, Washington, DC (US)

(73) Assignee: De Luca Oven Technologies, LLC, San Francisco, CA (US)

( * ) Notice: Subject to any disclaimer, the term of this patent is extended or adjusted under 35 U.S.C. 154(b) by 1115 days.

(21) Appl. No.: 11/889,265

(22) Filed: Aug. 10, 2007

(65) Prior Publication Data

US 2008/0037965 A1 Feb. 14, 2008

Related U.S. Application Data

(60) Provisional application No. 60/822,028, filed on Aug. 10, 2006.

(51) Int. Cl.
*A21B 2/00* (2006.01)

(52) U.S. Cl. ........... 392/416; 392/407; 219/411; 99/331

(58) Field of Classification Search ........................ None
See application file for complete search history.

(56) References Cited

U.S. PATENT DOCUMENTS 3,692,975 A 9/1972 Markus et al.
4,238,995 A * 12/1980 Polster ............................ 99/331
4,317,025 A 2/1982 Starnes
4,734,562 A * 3/1988 Amano et al. ................ 219/413
5,097,112 A * 3/1992 Kanaya et al. ................ 219/411
5,250,775 A 10/1993 Maehara et al.
5,598,769 A * 2/1997 Luebke et al. .................. 99/395
5,783,927 A * 7/1998 Chen ............................. 320/110
5,786,568 A 7/1998 McKinney
5,786,569 A * 7/1998 Westerberg ................... 219/411
5,982,645 A * 11/1999 Levran et al. ................... 363/37
6,013,900 A * 1/2000 Westerberg et al. .......... 219/405
6,037,571 A 3/2000 Christopher
6,297,481 B1 10/2001 Gordon
6,670,586 B2 * 12/2003 Ingemanson et al. ......... 219/492
7,002,265 B2 * 2/2006 Potega .......................... 307/149
7,105,778 B1 * 9/2006 DeLong et al. ............... 219/386
7,105,779 B2 * 9/2006 Shei ............................. 219/413
7,212,735 B2 * 5/2007 Konishi ........................ 392/407
2002/0166890 A1 * 11/2002 Hsuan et al. .................. 235/375
2003/0016954 A1 * 1/2003 Bikhovsky .................... 392/458
2005/0100331 A1 * 5/2005 Konishi ........................ 392/407

FOREIGN PATENT DOCUMENTS

DE 102 00 530 A1 7/2003
EP 1 580 145 A1 9/2005

OTHER PUBLICATIONS

International Search Report and Written Opinion of the International Searching Authority, mailed Jun. 27, 2008. "Smoke detector", http://en.wikipedia.org/wiki/Smoke_detector, Retrieved on Jul. 17, 2007, pp. 1-7.

* cited by examiner

*Primary Examiner* — Thor Campbell
(74) *Attorney, Agent, or Firm* — Winston & Strawn LLP

(57) ABSTRACT

An oven is configured with a cooking cavity for receiving a cooking load, a circuit for current supplied by one or more stored energy devices such as rechargeable batteries, and a heater comprising one or more radiant lamps to be driven by the current, the one or more radiant lamps being sized and positioned for heating the cooking load. The lamps are driven by current discharged from the batteries to radiantly heat a cooking load. An application of this stove configuration is in a toaster which is capable of toasting slices of bread in a matter of seconds.

43 Claims, 6 Drawing Sheets

RADIANT OVEN

FIG. 1 RADIANT OVEN CIRCUIT

SMALL
BULBS

FIG. 3 CYLINDRICAL BULBS

FIG. 4 RADIANT OVEN

FIG. 6 SAFETY SURFACE
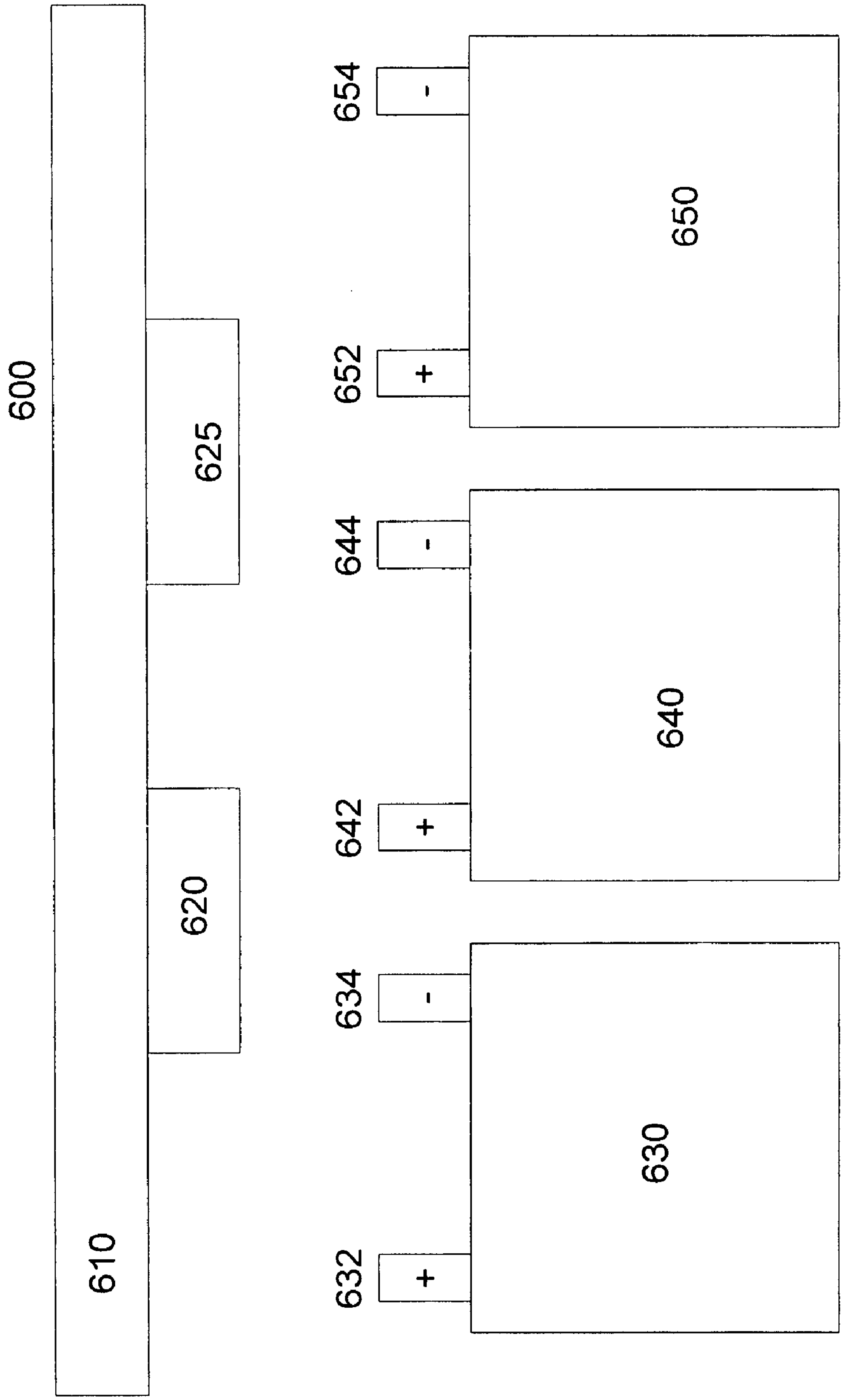

RADIANT OVEN WITH STORED ENERGY DEVICES AND RADIANT LAMPS

RELATED APPLICATIONS

This application claims priority to U.S. Provisional Application 60/822,028 filed Aug. 10, 2006, incorporated herein by reference.

TECHNICAL FIELD

The present subject matter relates to a radiant oven using stored energy devices to rapidly heat a cooking load.

BACKGROUND

In recent years, toasting bread or bagels in homes and restaurants has become an ubiquitous practice typically accomplished using toasters or toaster ovens that are plugged into an ordinary household outlet. The toasting process involves the heating of bread to reduce its water content by about 10-15% through evaporation from an original level ranging from 35-50%. Toasting also caramelizes the surface of the bread, converting and oxidizing complex sugars. As caramelization occurs, volatile chemicals are released producing a characteristic caramel smell. Caramelization is the oxidation of sugar, and is a type of non-enzymatic browning. If sucrose is present, then a sucrose molecule may combine with a water molecule to produce a glucose molecule and a fructose molecule, which increases sweetness. The chemical reaction is: $C_{12}H_{22}O_{11}$ (sucrose)+$H_2O$ (water)=$C_6H_{12}O_6$ (glucose)+$C_6H_{12}O_6$ (fructose). Additionally, butter, cheese, or other spreads are often placed on bread before or after toasting. Typical cooking times for toasting bread range from approximately 120 to 300 seconds, depending on the level of caramelization required as well as the number of slices of bread simultaneously toasted. Speeding up this process to less than 60 seconds has not been accomplished to date.

Kitchen appliances for homes are generally designed for use with standard 120 VAC in the United States and 220 VAC in Europe. Some motor home vehicles and camping trailers use a standard 12 VDC car or marine battery as a power supply, and convert (as described in U.S. Pat. No. 5,267,134 by Banayan) 12 VDC from the battery into 120 VAC at up to 15 Amps, as in a typical household outlet. The total power delivered to a piece of toast in a toaster or toaster oven is a function of the resistance of the associated heating elements and follows Ohm's Law, but is inherently limited by the power available from the power supply. The total energy required to toast a slice of bread or bagel ranges from about 25 to 50 W-hours. Standard household outlets are able to safely deliver a maximum power of 1800 W, which yields a minimum toasting time of about 50 to 100 seconds for a slice of bread assuming the power is used 100% efficiently.

Toasters and toaster ovens are generally used by consumers as moveable appliances, and are designed to work in standard household outlets. Some special outlets are designed for high power and may deliver more than 15 Amps of current, but these special outlets are considered "dedicated" outlets for fixed items such as large ovens, dishwashers, or refrigerators. Thus, there is currently no method available to reduce cooking time while using a typical U.S. household outlet rated at 120 VAC and 15 Amps. There furthermore is no known method, using even dedicated outlets of high energy capacity, to reduce cooking time, for example, to under 30 seconds to toast a slice of bread.

SUMMARY

The teachings herein improve over conventional ovens by providing high speed infrared cooking using stored energy devices.

A radiant oven in accord with an aspect of the disclosure includes a cooking cavity for receiving a cooking load, a current connection for receiving current supplied by one or more stored energy devices, and a heater comprising one or more radiant lamps driven by the current connection and being sized and positioned for heating the cooking load.

For example, the radiant oven may use multiple infrared heating lamps such as halogen lamps or infrared emitter tubes. Halogen lamps and infrared emitter tubes provide some infrared energy in the range of 1 to 3 microns and may be connected in parallel or in series. Stored energy devices may be used as an energy source. A stored energy device is defined as any device that stores energy. For example, a battery stores energy in chemical form, a capacitor stores energy in electrical form, a flywheel stores energy in kinetic form, a spring stores energy in mechanical form, and so forth. A set of stored energy devices may be combined in parallel and/or in series in order to create the desired combined properties. For example, the stored energy devices may have a combined energy storage rating or capacity of at least 25 Watt-hours, and may have a combined power discharge rating or capacity of at least 3 kilowatts.

The stored energy devices may comprise rechargeable batteries. A charging system for the batteries may draw current from a standard household electrical wall outlet which may be rated at 120 VAC and 15 Amps.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 6 is a cross sectional drawing showing an example of a safety surface.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
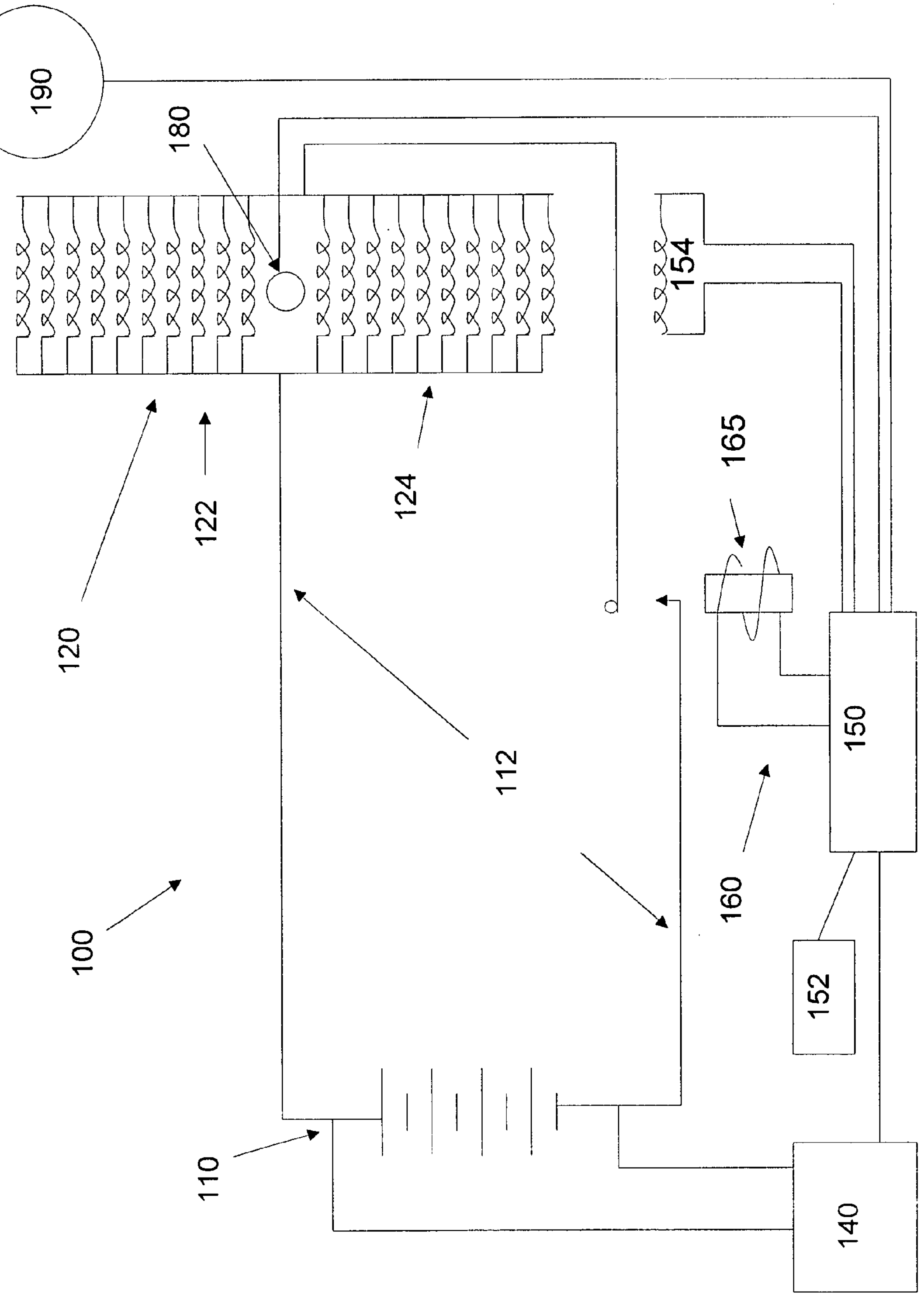
FIG. 1 is a schematic drawing describing an example of an electrical circuit for a radiant oven.

FIG. 1 is a schematic drawing describing an example of an electrical circuit for a radiant oven. Specifically, FIG. 1 illustrates circuitry 100 which represents a radiant oven capable of toasting bread in a period of less than 30 seconds. Circuitry 100 comprises a bank of one or more stored energy devices 110, such as rechargeable batteries, connected to a heater 120 through conductors 112.

The heater 120 comprises an upper array 122 and lower array 124 of bulbs 130. The bulbs 130 each may be a low voltage compact infrared bulb, or a high voltage long cylindrical bulb, or any type of radiant lamp. The upper array 122 and the lower array 124 may be positioned on opposite sides of a cooking load for evenly heating the cooking load. Alternatively, a single array of bulbs may be used.

Stored energy devices 110 may store 12-300 Volts depending on the voltage required by each bulb 130, and depending on whether the bulbs are wired in series or in parallel. The stored energy devices may be batteries, or capacitors, or flywheels, or the like. Charging of the batteries is controlled by a control circuit 150 and a charger 140, controlled to recharge the batteries, as needed.

Control circuit 150 also controls current supplied to the heater 120 by controlling a relay 160 and solenoid coil 165. Alternatively, solid state switches such as silicon controlled rectifiers (SCRs) may be used to control the current. The conductors 112 must be sized to carry the large currents required. Control circuit 150 may receive input from a sensor 180. Sensor 180 may measure temperature of the cooking load directly or indirectly as by monitoring infrared cavity temperature. Alternatively, sensor 180 may measure the power supplied to the heater, the energy consumed by the heater, the light emitted by the heater, the gases emitted by the cooking load, the particles (smoke) emitted by the cooking load, temperature, and/or similar parameters, in order to control current supplied to the heater. Sensors of these types are well known in the art.

The radiant lamps 180 are configured to give off infrared light with a wavelength primarily of about one to three microns. Wavelengths of about one to three microns are well absorbed by food. Different lamps may be used that operate at different temperatures and different wavelengths for different purposes. The oven may have an array of bulbs that is easily removable (modularly as a whole array) so that a different array of bulbs may be inserted for a different purpose. For example, toasting white bread may be efficient with one type of bulb, whereas toasting pizza may be efficient with a different type of bulb. Alternatively, the voltage may be varied in order to cause a single bulb to give off radiant energy at a different wavelength.

Control circuit 150 controls the charger 140, the relay 160, and the fan and/or filter 190. The control circuit 150 cycles current to the heater on and off. This cycling feature may be used to avoid burning the outer surface of the cooking load. Variable duty ratio cycling may be used to effectively control the voltage provided to the heater. For example, a silicon controlled rectifier may cycle at a duty ratio that is responsive to the difference between a measured temperature and a desired temperature or at a duty ratio that is fixed or variable depending on load characteristics. Thus, voltage to the lamps 130 may be accurately controlled.

Control circuit 150 may calculate energy consumed by the heater over a period of time by integrating power with respect to time. The amount of energy delivered to (or consumed by) the lamps is strongly related to the amount of energy absorbed by the cooking load, and thus is strongly related to the condition of the final cooked product.

Conventional toaster ovens typically use a timer. However, a radiant oven receiving current from an energy storage device may be subject to a substantial variation in voltage (and thus in power) as the energy storage device is discharged. Additionally, the initial voltage from the energy storage device may be a function of the state of charge of the energy storage device. Thus, calculating the energy consumed by the radiant heater is a good measure of the “performance” or the “production” of a radiant oven associated with an energy storage device, and facilitates a more predictable and more repeatable final cooked product.

An analog circuit may be used to calculate the energy consumed by the heater. For example, a calibrated resistor (perhaps 0.01 ohm) may be inserted into one of the conductors 112 such that all current to the lamps 120 passes through the calibrated resistor. The voltage across the calibrated resister is directly proportional to the current through the resister (V=IR). Thus, the measured voltage across a known resistor may be used to calculate the current (I=V/R). Control circuit 150 may measure the voltage across the calibrated resistor and the voltage across the lamps, and thus effectively calculate the instantaneous power. The instantaneous power may be accumulated over time to yield the energy consumed by the lamps. Alternatively a digital circuit may be used to repeatedly (perhaps 60 times per second) measure the voltage across the calibrated resistor and the voltage across the lamps. Thus, the digital circuit may calculate the power 60 times per second, and may perform a step-wise integration of the power over time in order to calculate the energy consumed by the lamps.

The control circuit 150 may also preheat the radiant lamps before cooking the cooking load. The radiant lamps have a resistance which is related to temperature, and the resistance is low during a cold start up. This low resistance causes a large initial current to flow briefly during a cold start up. All of the oven components must be designed to operate properly with the largest current expected, which is the initial current. Thus, it is advantageous to slightly preheat the radiant lamps with a small current and/or small voltage before applying the full voltage. The preheating may be continuous, so that a small trickle current keeps the lamps slightly warm at all times. Alternatively, or additionally, preheating may be for a short time (such as two seconds at half of the full voltage) at a reduced voltage before applying the full voltage. The preheating current may be supplied from an external AC power source such as a wall outlet, in order to avoid discharging the stored energy devices. An infrared lamp using halogen (for example, manufactured by Sylvania Lighting®) typically requires 0.5 to 1 second to heat up from a cold start and produce infrared light. An infrared lamp using a carbon element (for example, manufactured by Hereus Noblelight®) also requires about one second to heat up from a cold start. Rapido® infrared emitter tubes manufactured by Soneko® require less than a second of warm-up time.

The control circuit 150 may estimate the cooking time as a function of such variables as an initial voltage of the batteries. If the batteries are not fully charged, then the cooking time for a slice of bread will be greater than if the batteries are fully charged.

The control circuit 150 may also monitor the condition of the cooking load by measuring: the color of the cooking load (for example, white toast is "done" when it turns medium brown), the moisture of the surface of the cooking load (for example, toast is "done" when the surface moisture is 25%), and/or the moisture in the air. If the oven air (air inside the cooking region) is re-circulated or not circulated, then the moisture in the oven air should initially increase and then plateau as the cooking load is cooked and gives off moisture. If the air is vented, then the moisture in the oven air should initially increase, then peak approximately as the cooking load gives off moisture at a maximum rate, and then decrease as the cooking load loses most of its moisture and gives off moisture at a low rate.

The control circuit 150 may be connected to an outlet 152 such as a standard household outlet rated at 120 VAC and 15 Amps. The outlet may be used as an external power source for the charger. Alternatively, the outlet 152 may be directly connected to the charger 140.

A fan or filtering system 190 is controlled by control circuit 150 and filters any smoke produced. The filtered air may be vented or recirculated to the oven.

Two switches may be configured in series as a safety feature. Both switches must be turned on for the lamps to heat, and the lamps will stop heating if either switch is turned off. This safety feature solves the problem of a single switch fusing (getting stuck) in the on position (under high current conditions) and preventing a user from shutting off the oven. For example, the relay switch 160 of FIG. 1 may be replaced with two relay switches in series. Thus, the oven may be shut off even if a single switch fuses, because the second switch remains operative. Additional control circuitry may monitor the state of the relay switches, and may prevent further operation of the oven if one relay switch fuses.

The sensor 180 may monitor gases or particles emitted by the cooking load, as noted previously. This sensor information may be used to automatically shut off the oven if too much smoke is emitted. Additionally, the sensor information may be used to shut off the oven if the cooking load is sufficiently cooked. For example, a certain low moisture content in the air may indicate that bread is sufficiently toasted. More complex gases which indicate chemical reactions in the cooking load may also be monitored.

The radiant oven may also have an auxiliary heater 154, such as a conventional ceramic coated nichrome wire for heating the cooking load primarily through conduction and convection. Alternatively, one or more radiant lamps may be used as an auxiliary heater. A conventional heating element requires about 30 to 60 seconds to heat up because of a relatively large thermal mass and a relatively low power supply. The control circuit 150 may power the auxiliary heater from an alternating current external power source such as the standard household outlet 152 to directly power auxiliary heater 154. The auxiliary heater 154 may be wired as a separate circuit so it may be used as an alternative or supplemental cooking means. For example, the auxiliary heater 154 may be used when low power is needed (to keep things warm), in order to avoid wear and tear on the stored energy devices. Additionally, the auxiliary heater 154 may be used simultaneously with the stored energy devices to deliver a greater power and/or a greater energy than the stored energy devices could deliver by itself. Further, the stored energy devices may be sized relatively small (to reduce costs, and to save space) and be able to toast bread very quickly, but may be too small to bake a large pizza without additional energy from the auxiliary heater 154 which draws power from an external source such as a household outlet. Also, a relatively small stored energy device may substantially decrease the total baking time of a large pizza by quickly "dumping" its energy into the pizza and into the oven (including into the auxiliary heater 154), and thus quickly bringing the entire oven system up to the appropriate cooking temperature (perhaps 350 degrees) for conventional cooking by the auxiliary heater. The auxiliary heater 154 may assist during this initial heat up period, and then the auxiliary heater may solely maintain the oven temperature during the remainder of the cooking period.

The auxiliary heater 154 is preferably located in a position to minimize the blockage of radiation coming from the infrared lamps towards the cooking load. For example, the auxiliary heater may be interleaved with subarrays of radiant bulbs. The auxiliary heater may be located in front of a metal current carrying element, such as in front of a bus for the radiant elements. The auxiliary heater may be located on a surface that is generally perpendicular to the surface of the infrared lamps. For example, a horizontal upper array of radiant lamps may be located above a horizontal support tray, and an auxiliary heater element may be located vertically near a back surface of the oven or near a side surface of the oven.

Figure 2:
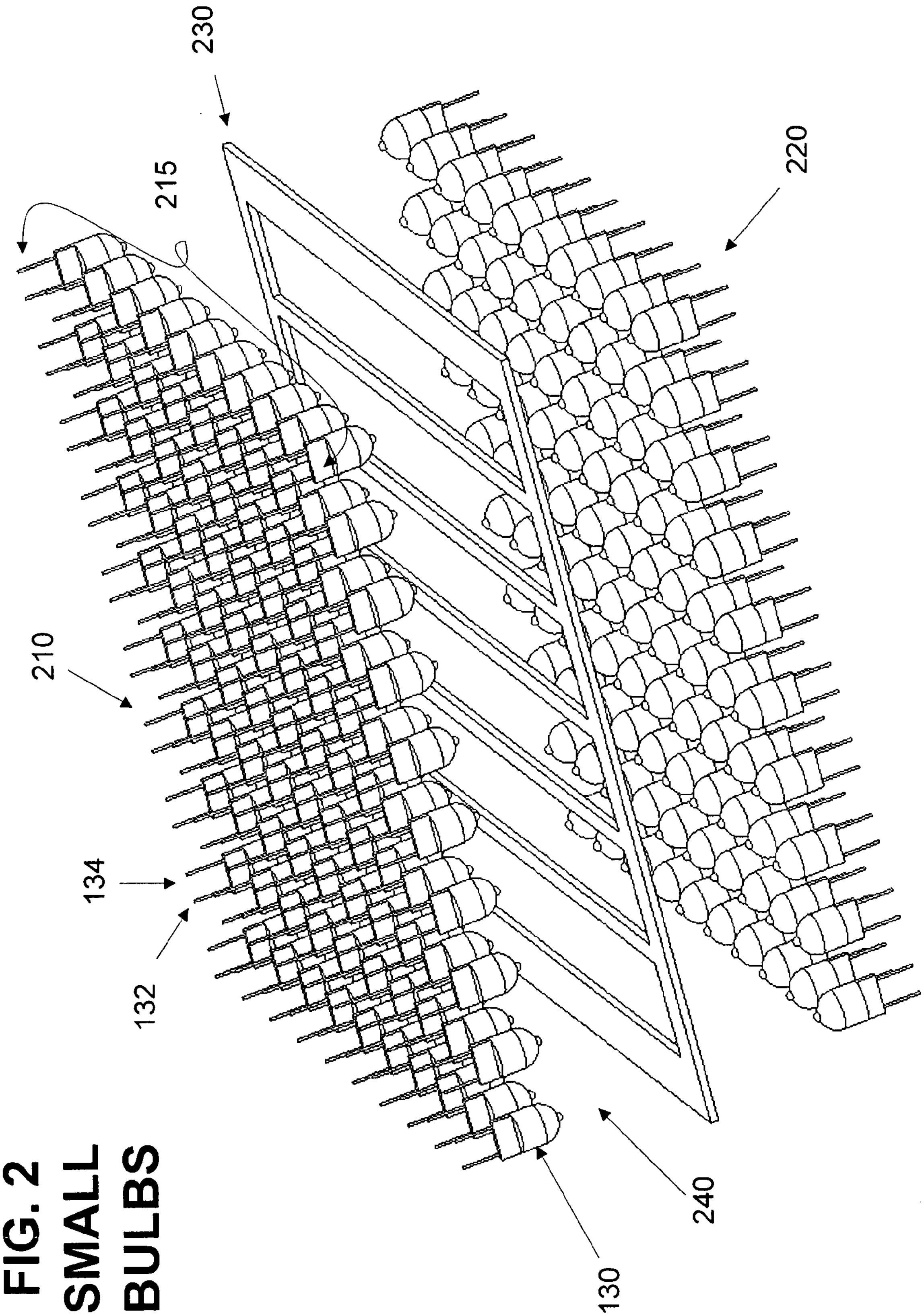
FIG. 2 is an isometric drawing showing an example of a heating element arrangement using lamps in the form of small bulbs.

FIG. 2 is an isometric drawing showing an example of a heater arrangement using low voltage small lamps or bulbs as radiant lamps, which can be used in the radiant oven of FIG. 1. Specifically, a single lamp 130 has a first pin connection 132 and a second pin connection 134 for receiving current. A row of 10 lamps creates sub-array 215. Multiple sub-arrays are placed side by side to form a complete top array 210 and a complete bottom array 220.

Lamp 130 may be a low voltage bulb designed to operate on 12-36 V. Two arrays (210 and 220) are positioned on either side of tray 230. Between the top array 210 and the tray 230, a glass plate or shield (not shown) may be positioned in glass plate area 240 and supported by the tray 230 to catch crumbs and grease, and to prevent crumbs and grease from reaching and damaging the bulbs. Due to the compact nature of lamp 130 as shown, the lamps may be arranged in a rectangular grid and electrically connected by a planer bus with parallel and interleaved connections. The bus may be copper, or aluminum, or zinc plated steel.

The performance characteristics of the lamp may be varied by setting the driving voltage of the lamp lower or higher than the rated voltage of the lamp. For example a lamp that is rated at 24 V may last ten times as long at a reduced voltage of 18 V.

Additionally, the spectrum of light emitted from the lamp changes as a function of the voltage. Thus, a standard or commercial lamp may be operated at a non-standard voltage to emit an optimum spectrum of light for the type of food being cooked. For example, a commercial "24 V" rated lamp may be operated at 20 V, or at 28 V.

Lamps 130 may be located within one or more chambers (not shown) on one or more sides of a supporting tray. One side of a chamber may include a radiation transmissive material such as glass to transmit radiation from a lamp to the cooking load. The chamber may be configured to hold a vacuum relative to an atmospheric pressure. In other words, the chamber may have a negative gauge pressure with respect to the atmospheric pressure. Ambient atmospheric pressure at sea level is approximately 14.7 pounds per square inch (absolute). Thus, a vacuum chamber with a relatively strong vacuum of 1 pound per square inch (absolute) would be measured by a pressure gauge as having negative 13.7 pounds per square inch (gauge) with respect to the ambient atmospheric pressure.

For example, a first chamber may be located above the cooking load, and may hold an array of lamps in a vacuum. The chamber may be filled with a gas mixture other than air. For example, the gas mixture may include neon or other inert gases for reducing or preventing oxidation of lamps in the chamber. The gas pressure in the chamber may be held in a vacuum, as discussed above.

The chamber may include at least one pressure sensor for detecting break in the seal of the chamber, and the sensor may be attached to circuitry controlling the power to the lamps in the chamber. For example, if the chamber loses vacuum, then the power to lamps in the chamber may be turned off.

Figure 3:
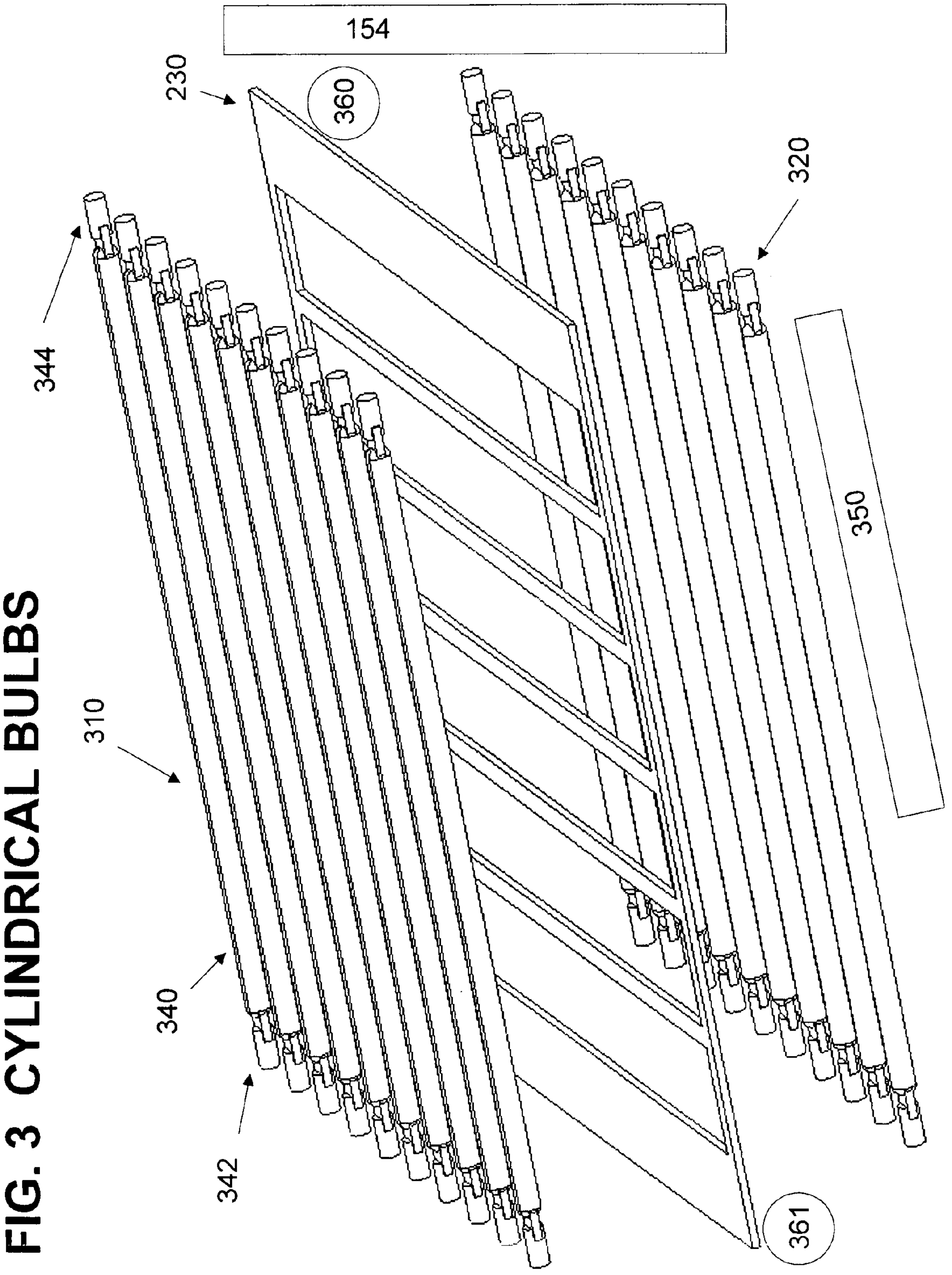
FIG. 3 is an isometric drawing showing an example of a heating element arrangement with long cylindrical bulbs.

FIG. 3 is an isometric drawing showing an example of a heating element arrangement using high voltage long cylindrical lamps. Specifically, FIG. 3 illustrates two arrays (top array 310 and bottom array 320) formed using cylindrical lamps 340 with electrical terminal ends 342 and 344. One array is placed above and one array is placed below the support tray 230.

Reflector 350 may be positioned below the bottom array 320, or above the top array 310 to reflect radiant energy towards the cooking load. Reflector 350 may comprise a set of individual reflectors for each cylindrical lamp, or may comprise a flat sheet attached to an interior surface of the oven. Alternatively, a reflecting surface my be incorporated as a coating on or in a surface of a lamp. For example, Rapido® bulbs by Soneko are available with ceramic coatings.

Auxiliary heater 154 is shown oriented perpendicularly to the cylindrical lamps.

Figure 4:
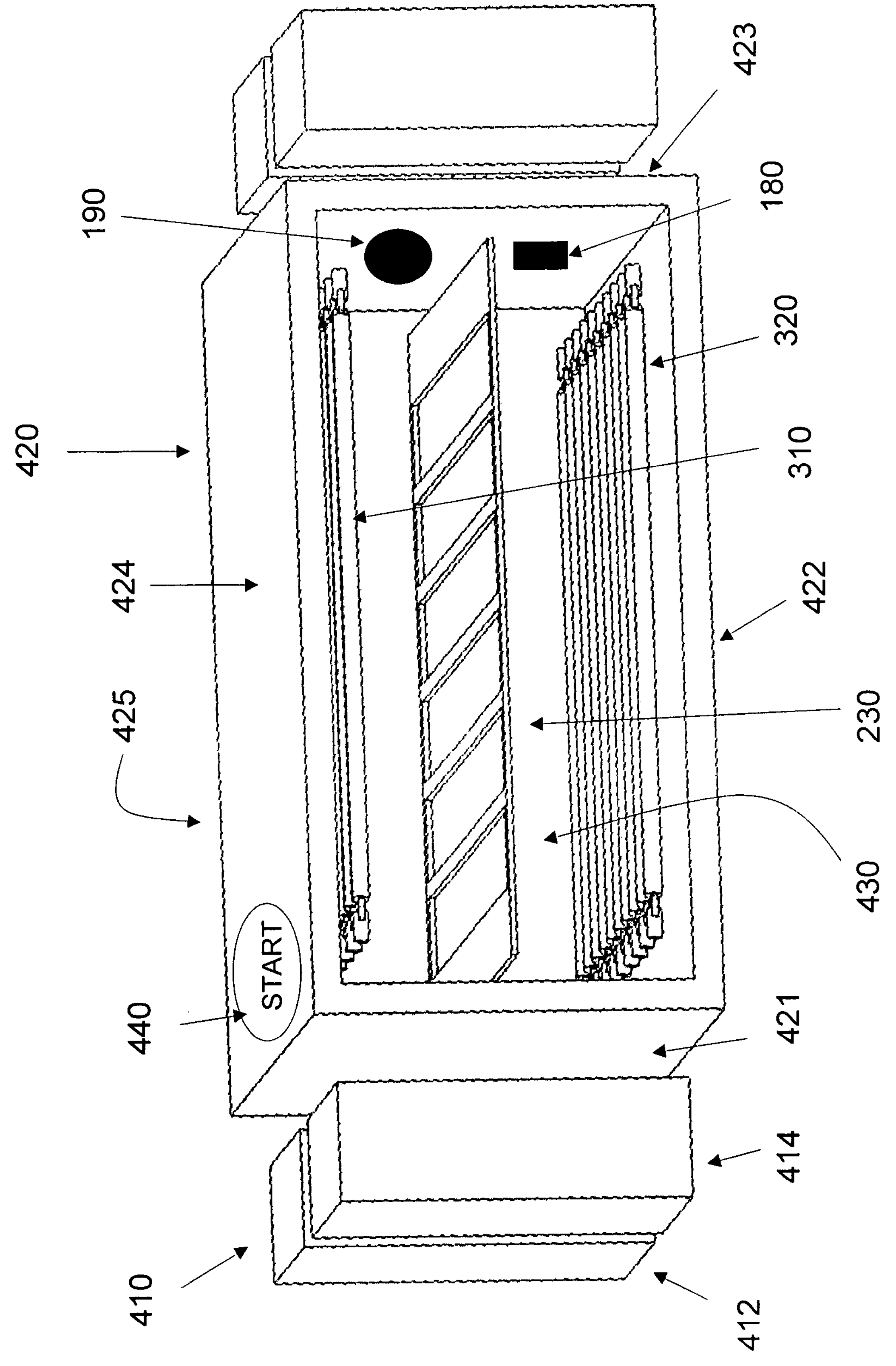
FIG. 4 is an isometric drawing illustrating an example combining the schematic of FIG. 1 and the heating elements of FIG. 3.

FIG. 4 is an isometric drawing illustrating an example combining the schematic of FIG. 1 and the heating lamps of FIG. 3. Specifically, FIG. 4 illustrates a heater comprising two arrays of cylindrical lamps (top array 310 and bottom array 320) placed in a cooking cavity 430 enclosed by a containment cell 420. The containment cell 420 has a left side 421, bottom 422, right side 423, top 424, and back 425, a front door is not shown. A battery pack 410 is located on the left side 421 of the containment cell 420. The battery pack may be comprise multiple 12 V batteries (412 and 414) connected in series and/or parallel to deliver 25 KW at 24 V. Sensor 180 is located inside the cavity 430. The fan 190 and is connected to control circuit 150 (not shown). Activation switch 440 activates the lamps by sending a signal to the control circuit 150, which in turn activates the relay 160 (not shown). Tray 230 for supporting a cooking load is located in cavity 430 of the containment cell 420, and may be moved with respect to arrays 310 and 320. Alternatively, the tray may be held fixed with respect to one of the arrays, and the secondary array moved towards or away from the tray.

At least one radiant lamp, or one array of radiant lamps, may be movable relative to the cooking load. For example, top array 310 may be movable in a direction perpendicular to (or normal to) the top surface of the cooking load, or may be moveable in a direction parallel to the top surface of the cooking load. In other words, the top array may be movable upwards away from the cooking load, or downwards towards the cooking load.

The support tray 230 for supporting the cooking load may be moved horizontally to evenly radiate the cooking load. For example the support tray may be automatically cycled horizontally towards the back of the oven and then forwards towards the front of the oven so that the long cylindrical lamps of FIG. 4 evenly radiate the cooking load. If the support tray moved backwards and forwards a distance approximately equal to the spacing between the cylindrical lamps, then every part of the cooking load would spend some time directly underneath a cylindrical bulb.

If compact individual lamps are used (as shown in FIG. 2), then a more complex cyclical horizontal motion may be desired. The support tray may be automatically cycled in a concentric motion, such that each corner of the support tray simultaneously moved in its own small horizontal circle of perhaps one inch in radius. Thus, the support tray would have a range of motion totaling two inches (the diameter) horizontally forwards and backwards, and two inches (the diameter) horizontally left and right. A concentric motion with a diameter of approximately the pitch between adjacent lamps in an array of lamps may yield a relatively even radiant heating of the cooking load. For example, the far right corner of support tray 230 may cycle concentrically about circle 360, and the near left corner of support tray 230 may simultaneously cycle concentrically about circle 361.

The support tray 230 may be located between two heating arrays 310 and 320 that are parallel to each other, and the support tray may have an average thickness less than one inch, and preferably of less than one tenth of an inch. A thin support tray tends to have low mass, and thus tends to heat up quickly.

The support tray 230 may be movably attached to the radiant oven so that it may be manually moved by a user. For example, the support tray may be supported by a set of channels (not shown) on the left side and the right side of the oven, and the support tray may be moved upwards or downwards to different levels on different channels. The support tray may be associated with a locking mechanism (not shown) that may be selectively disengaged. For example, a removable pin may lock the support tray into a fixed position so that it does not slide out of the oven when the cooking load is removed. The support tray may have sides or support rods (not shown) that are extendable in a direction normal to a movement of the tray, and that adjust as the support tray is moved. For example, a base support tray may be pulled horizontally out of the oven while still supported by the sides or support rods.

The support tray may partially be made of an electrically non-conductive material that is able to withstand high temperature, such as glass, ceramic, glass filled phenolic, or silicone. For example, Pyrex® may be used as a material for a support tray. Preferably the support tray should transmit infrared radiation in the 1 to 3 micron range from the lower array upwards to the cooking load, and should prevent crumbs and grease from dropping onto the lower array. Alternatively, the support tray may be a conventional metal grate.

A cooking load (not shown) with a thickness of a first dimension may be placed on the tray 230, and then the tray may be positioned approximately a distance of the first dimension from the bottom heating array, and the support tray may be positioned approximately a distance of two times the first dimension from the top heating array. Alternatively, the heating arrays may be equidistant from the nearest surface of the cooking load, or the heating arrays may be equidistant from the center of the cooking load. Further, the heating arrays may be linked or coordinated mechanically so they move simultaneously. For example, a top heating array and a bottom heating array may simultaneously move towards the upper surface and lower surface of the cooking load, respectively. Movement of the heating arrays may be actuated by a hand dial or by a lever located on the outside of the oven, or by a motor. For example, a hand dial may mechanically move a top heating array downward towards the cooking load and simultaneously move a bottom heating array upward towards the cooking load.

The minimum distance from the cooking load to any heating array may be restricted to not less than one half of an inch. Increasing the distance from the cooking load to a heating array creates a more uniform radiation power density (Watts/square inch) on the cooking load. Thus, increasing the distance creates a more even "tan" on the cooking load. However, increasing the distance decreases the efficiency of radiant transfer from the arrays to the cooking load.

Thickness of the cooking load may be measured automatically using lasers, diodes, cameras, or ultrasonics (not shown). For example, a laser range finder may measure a distance (range) from the top surface of a cooking load to the range finder, and use this measurement to calculate a thickness of the cooking load. The thickness measurement may be used to position the heating arrays, as discussed above, or to control the power to the heater or the time for properly cooking the cooking load.

The radiant oven may have reflectors (not shown) near the lamps to reflect the radiation towards the cooking load. For example, each lamp may have an individual reflector, or each subarray of lamps may have a subarray reflector, or each array of lamps may have an array reflector, or the interior walls of the oven may have a reflective surface. Reflectors may be placed on the inside of an oven door (not shown) to reflect radiation towards the cooking load. Some portion of the oven door may be glass without a reflector to allow a user to view the cooking load. Alternatively, the glass may have a thin film of metal to act as a partial mirror, for reflecting some of the radiation towards to cooking load but allowing some light to pass through to allow the user to view the cooking load.

Battery pack 410 may contain multiple batteries covered by a plate or a lid or a connecting surface (not shown, see FIG. 6). The plate (or connecting surface) connects the storage energy devices in series or in parallel. If the plate is removed, then the multiple storage energy devices are decoupled or isolated. Alternatively, battery pack 410 may include a vacuum chamber, designed so that vacuum in the chamber pulls, or distorts, or bends, or buckles a connecting surface into a connecting position which connects the storage energy devices in series or in parallel. If the vacuum in the chamber is lost, then the connecting surface returns to a safe position and the multiple storage energy devices are decoupled or isolated.

Table 1 illustrates cooking times from an experimental radiant oven similar to FIG. 3, using a 150 V battery system producing 25 KW of power. A slice of bread was toasted in 3.5 seconds. A frozen pizza was defrosted and cooked in about 22 seconds.

TABLE 1

EXPERIMENTAL RADIANT OVEN
Cooking Time Results @ 25 KW 2500 Degree (K) Bulb Color Temperature

| Item Description | Time Required (Sec) |
|---|---|
| Thin Slice Toast (white bread) | 3.5 |
| Bagel Half (plain) | 5 |
| Hog Dog (directly from refrigerator) | 20 |
| Pizza (directly from freezer) | 22 |
| Bacon Strips (grilled in fat) | 30-40 |
| Grilled Cheese Sandwich | 10-15 |

Figure 5:
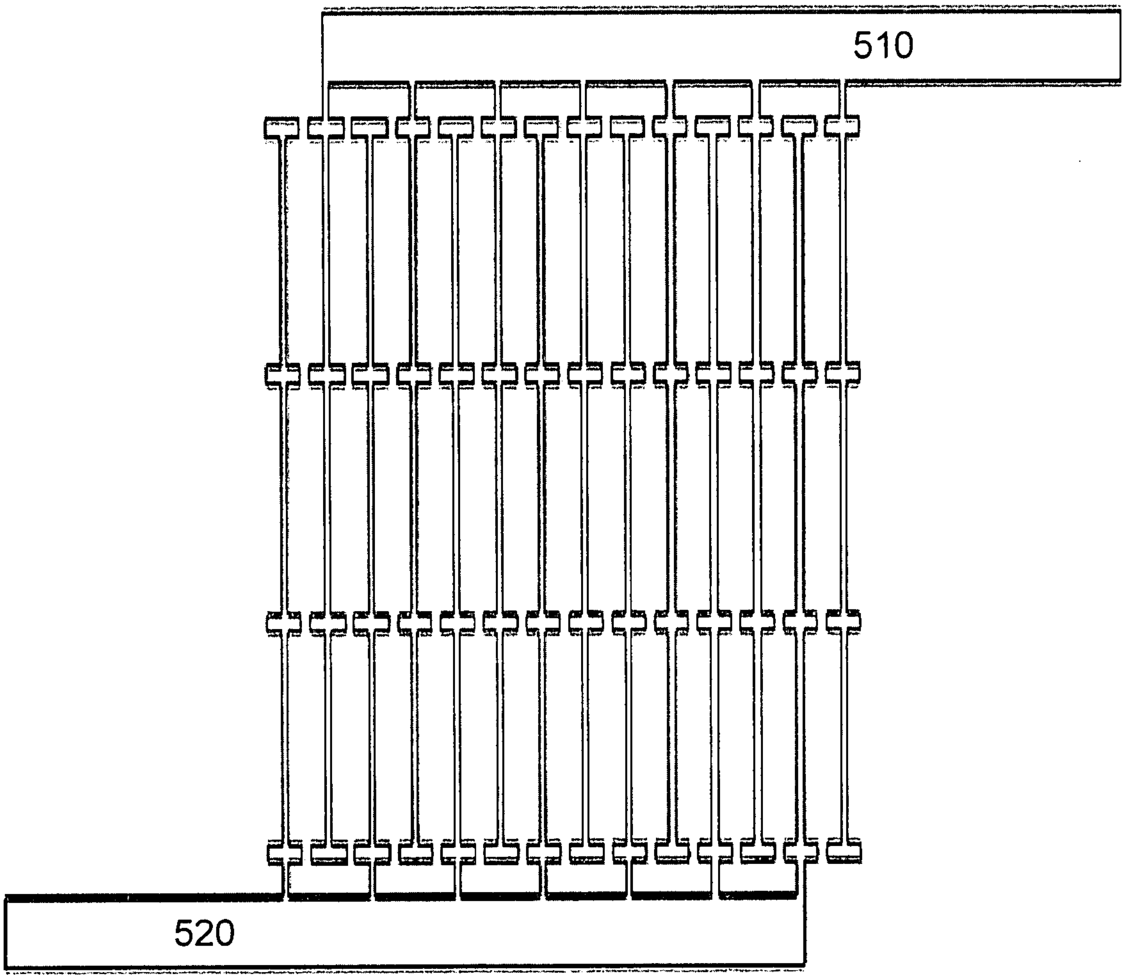
FIG. 5 is a drawing of an example of two buses for an array of lamps.

FIG. 5 is a drawing of an example of two buses for an array of lamps, as may be implemented herein. Specifically, a first bus 510 and a second bus 520 supply electricity to an array of lamps (not shown). The first bus 510 comprises a first lead and a first set of fingers extending perpendicularly from the first lead. The second bus 520 comprises a second lead and a second set of fingers extending perpendicularly from the second lead, wherein the first lead is parallel to the second lead, and wherein the first set of fingers is interleaved with the second set of fingers. Thus, each sub-array of lamps 215 of FIG. 2 may be positioned so that the first terminal of each lamp connects with one finger of the first bus, and the second terminal of each small lamp connects with one finger of the second bus. In other words, the lamps of one subarray are electrically in parallel with each other, and connected to the same finger of the first bus and the same finger of the second bus. The first bus may be in electrical communication with a positive portion of the current connection and the second bus may be in electrical communication with a negative portion of the current connection.

FIG. 6 is a cross sectional drawing showing an example of a safety surface. The safety surface 600 (or connecting surface, or safety plate) connects the storage energy devices in series or in parallel. If the safety surface 600 is removed, then the multiple energy storage devices, such as 12 volt batteries 630, 640, and 650 are decoupled or isolated. For example, safety surface 600 comprises insulator 610 and electrical couplers 620 and 625. Electrical coupler 620 is electrically isolated from electrical coupler 625 by insulator 610. FIG. 6 illustrates a position wherein safety surface 600 is removed from the batteries. If the safety surface 600 is moved downward, then electrical coupler 620 will connect a negative terminal 634 of battery 630 to a positive terminal 642 of battery 640. Similarly, electrical coupler 624 will connect a negative terminal of battery 640 to a positive terminal 652 of battery 650. In this fashion, three 12 volt batteries are coupled in series to yield 36 volts. If the safety surface 600 is removed, then only a maximum of 12 volts is possible when any two terminals are connected. For example, connecting terminal 632 to terminal 634 will yield 12 volts, but connecting terminal 632 to any other terminal will yield 0 volts, because all of the batteries are isolated. Thus, a high voltage system is safely decoupled into multiple isolated low voltage systems when the safety surface 600 is removed.

In one example, an electrical coupler contains a small rectangular bus (not shown). A first end of the small rectangular bus slides into a recessed negative terminal (not shown) of a first battery, and into a recessed positive terminal of a second battery. This creates a sliding connection, similar to a manual knife switch. In a second example, conventional male and female connectors (not shown) are utilized. A positive terminal of a first battery is connected to a first lead of a double female connector (a connector with two orifices for receiving a double male connector with two protruding leads), and a negative terminal of a second battery is connected to a second lead of a double female connector. The plate contains the double male connector. The male connector is "short circuited" so that the two protruding leads are electrically connected. The male connector is attached to the plate, and is positioned to insert into the double female connector when the chamber is closed, thus connecting the first battery and the second battery in series. Alternatively, safety surface 600 may be associated with a vacuum chamber, designed so that vacuum in the chamber pulls, or distorts, or bends, or buckles safety surface 600 into a connecting position which connects the storage energy devices in series or in parallel. If the vacuum in the chamber is lost, then the connecting surface returns to a safe position and the multiple storage energy devices are decoupled or isolated.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A radiant oven comprising:

a cooking cavity configured for receiving a cooking load; one or more energy storage devices;

a circuit for carrying current supplied by the one or more stored energy devices;

a main heater comprising one or more radiant lamps to be driven by the current, the one or more radiant lamps being sized and positioned for heating the cooking load, and being movable to adjust spacing with respect to the cooking load;

a first bus comprising a first lead and a first set of fingers extending perpendicularly from the first lead; and a second bus comprising a second lead and a second set of fingers extending perpendicularly from the second lead, wherein the first lead is parallel to the second lead, and wherein the first set of fingers is parallel to and interleaved with the second set of fingers.

2. The radiant oven of claim 1, wherein the stored energy devices are batteries.

3. The radiant oven of claim 2, wherein the batteries have an energy storage capacity of at least 25 watt-hours.

4. The radiant oven of claim 2, wherein the batteries have a power discharge capacity of at least 3 kilowatts.

5. The radiant oven of claim 1, wherein the one or more lamps comprises a halogen lamp.

6. The radiant oven of claim 1, wherein the comprises multiple lamps arranged in parallel in at least one plane.

7. The radiant oven of claim 1, wherein the one or more lamps comprises multiple compact lamps arranged in at least one planar matrix.

8. The radiant oven of claim 1, further comprising a charger for charging the one or more stored energy devices by drawing power from an external power supply.

9. The radiant oven of claim 1, further comprising:

a tray for supporting the cooking load in the cooking region.

10. The radiant oven of claim 1, further comprising a relay for cycling the current connection to the main heater, and a control circuit for controlling the relay.

11. The radiant oven of claim 10, further comprising:

a fan controlled by the control circuit for exhausting the cooking region; and a temperature sensor in communication with the control circuit.

12. The radiant oven of claim 1, further comprising:

a control circuit for controlling current to the main heater by cycling on and off at a duty ratio in response to a user input or automatically in response to a measured parameter indicting a condition of the cooking load.

13. The radiant oven of claim 1, further comprising:

a tray for supporting the cooking load, and a rotator, the rotator being configured move the tray in a concentric motion for evenly radiating the cooking load.

14. The radiant oven of claim 1, wherein the one or more lamps comprises at least two radiant lamps, the at least two radiant lamps sharing the first bus and the second bus, wherein the first bus is in electrical communication with a positive portion of a current connection and the second bus is in electrical communication with a negative portion of the current connection.

15. The radiant oven of claim 1, further comprising two switches configured in series, wherein both switches must be turned on for the main heater to receive current from a current connection, and wherein the main heater will not receive current from the current connection if either switch is turned off.

16. The radiant oven of claim 1, further comprising a sensor for monitoring gases or particles emitted by the cooking load.

17. The radiant oven of claim 1, further comprising an energy calculation circuit for calculating an energy consumed by the main heater by integrating power with respect to time.

18. The radiant oven of claim 17, wherein the integrating is approximated based upon discrete periodic measurements of current and voltage supplied to the main heater.

19. The radiant oven of claim 1, further comprising a tray for supporting the cooking load, the tray being located between a top array of radiant lamps and a bottom array of radiant lamps, and the tray having an average thickness of less than one inch.

20. The radiant oven of claim 19, wherein the cooking load has a thickness, and:

the bottom array of radiant lamps is located a first distance below the tray, the first distance being approximately equal to the thickness of the cooking load; and the top array of radiant lamps is located a second distance above the tray, the second distance being approximately equal to twice the thickness of the cooking load.

21. The radiant oven of claim 1, further comprising a measurement device for measuring a thickness of the cooking load.

22. The radiant oven of claim 1, wherein a minimum distance from the cooking load to any radiant lamp is not less than one half of an inch.

23. The radiant oven of claim 1, further comprising a tray for supporting the cooking load, the tray being movably attached to a chassis of the radiant oven for adjusting the position of the tray manually.

24. The radiant oven of claim 1, further comprising a tray for supporting the cooking load, wherein the tray is made of an electrically non-conductive material that is able to withstand high temperature.

25. The radiant oven of claim 1, further comprising an auxiliary heater and a control circuit, wherein the control circuit is configured to power the auxiliary heater from an alternating current external power source, and the control circuit is configured to power the auxiliary heater independently of or simultaneously with the main heater, and the auxiliary heater is configured to heat the cooking load primarily through conduction and convection.

26. The radiant oven of claim 25, wherein a heating element of the auxiliary heater does not block a line of sight path between the one or more radiant lamps and the cooking load.

27. The radiant oven of claim 25, wherein the heating element of the auxiliary heater is located in front of a metal current carrying element.

28. The radiant oven of claim 25, wherein the heating element of the auxiliary heater is located on a surface that is approximately perpendicular to the surface of the one or more infrared lamps.

29. The radiant oven of claim 1, further comprising one or more reflectors sized and positioned near the one or more lamps to reflect radiation towards the cooking load.

30. The radiant oven of claim 1, further comprising an oven door, and one or more reflectors on or in the oven door for reflecting radiation towards the cooking load.

31. The radiant oven of claim 1, further comprising a control circuit for preheating the one or more radiant lamps using small current.

32. The radiant oven of claim 1, further comprising a control circuit for estimating a cooking time using an initial voltage of the stored energy device as a parameter.

33. The radiant oven of claim 1, further comprising a control circuit configured for monitoring a condition of the cooking load by measuring one or more of the following parameters: a color of the cooking load, a moisture of the surface of the cooking load, a moisture of air in the oven.

34. The radiant oven of claim 1, wherein one radiant lamp is configured to emit infrared light including a wavelength of at least one micron and not more than three microns.

35. The radiant oven of claim 1, further comprising a first radiant lamp configured for operating at a first temperature and emitting a first light spectrum, and a second radiant lamp configured for operating at a second temperature and emitting a second light spectrum.

36. The radiant oven of claim 1, further comprising a voltage control circuit configured for varying the voltage of a radiant lamp.

37. The radiant oven of claim 1, further comprising a safety connection surface configured to electrically couple two stored energy devices and to block access to the two stored energy devices when the safety connection surface is in a first position, and configured to electrically decouple the two stored energy devices when the safety connection surface is in a second position.

38. A radiant oven comprising:

a cooking cavity for receiving a cooking load;

one or more stored energy devices with an energy storage capacity of at least 25 watt-hours, and with a power discharge capacity of at least 3 kilowatts;

a circuit for carrying current supplied by the one or more stored energy devices; and a heater in the circuit, the heater comprising a top array of infrared radiant lamps in a top horizontal plane, and a bottom array of infrared radiant lamps arranged in a bottom horizontal plane;

a mechanism for adjusting a position of at least one of the infrared heating lamps;

a charger for charging the stored energy device:

a switching device for electrically connecting and disconnecting the current connection with the heater;

a control circuit for controlling the switching device;

a first bus comprising a first lead and a first set of fingers extending perpendicularly from the first lead; and a second bus comprising a second lead and a second set of fingers extending perpendicularly from the second lead, wherein the first lead is parallel to the second lead, and wherein the first set of fingers is parallel to and interleaved with the second set of fingers.

39. The radiant oven of claim 38, further comprising:

a tray for supporting the cooking load, wherein the tray is located in a middle horizontal plane between the top horizontal plane and the bottom horizontal plane, and wherein the tray comprises materials for transmitting some infrared radiant energy from the bottom array to the cooking load.

40. The radiant oven of claim 38, further comprising:

a sensor connected to the control circuit for monitoring the cooking load; and a fan connected to the control circuit for exhausting the cooking region.

41. The radiant oven of claim 38, wherein the charger is configured to draw power from an outlet rated at about 120 Volts Alternating Current (V AC) and 15 Amps.

42. A cooking method, comprising the steps of:

providing a first bus comprising a first lead and a first set of fingers extending perpendicularly from the first lead;

providing a second bus comprising a second lead and a second set of fingers extending perpendicularly from the second lead;

locating a cooking load into a heating cavity including one or more radiant lamps;

adjusting a position of the one or more radiant lamps;

discharging current from a stored energy source through the one or more radiant lamps;

wherein the first lead is parallel to the second lead, the first set of fingers is parallel to and interleaved with the second set of fingers, and the one or more radiant lamps are electrically connected to the first bus or the second bus.

43. The cooking method of claim 42, in which the stored energy source comprises one or more rechargeable batteries.

* * * * *

UNITED STATES PATENT AND TRADEMARK OFFICE

CERTIFICATE OF CORRECTION

PATENT NO. : 8,126,319 B2
APPLICATION NO. : 11/889265
DATED : February 28, 2012
INVENTOR(S) : De Luca It is certified that error appears in the above-identified patent and that said Letters Patent is hereby corrected as shown below:

Title Page:
Item (56) References Cited, OTHER PUBLICATIONS, line 2, after "Jun. 27, 2008.", please delete ""Smoke detector", http://"; and on the following line, before "en.wikipedia.org/wiki/Smoke_detector," insert -- "Smoke detector", http:// --. The reference will then correctly appear as "Smoke detector", http://en.wikipedia.org/wiki/Smoke_detector, Retrieved on Jul. 17, 2007, pp. 1-7".

Column 11:
Line 33 (claim 6, line 1), before "comprises", insert -- main heater --.

Signed and Sealed this
First Day of May, 2012

David J. Kappos
*Director of the United States Patent and Trademark Office*